US006487098B2

(12) United States Patent
Malik et al.

(10) Patent No.: US 6,487,098 B2
(45) Date of Patent: Nov. 26, 2002

(54) POWER FACTOR CORRECTION (PFC) CIRCUIT THAT ELIMINATES AN INRUSH CURRENT LIMIT CIRCUIT

(75) Inventors: Randhir S. Malik, Cary, NC (US); William Hemena, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/775,121

(22) Filed: Feb. 1, 2001

(65) Prior Publication Data

US 2002/0101750 A1 Aug. 1, 2002

(51) Int. Cl.[7] .............................................. H02M 7/217
(52) U.S. Cl. ........................ 363/89; 323/222; 323/908
(58) Field of Search ............................ 363/16, 80, 84, 363/89; 323/222, 908

(56) References Cited

U.S. PATENT DOCUMENTS

| | | |
|---|---|---|
| 4,943,902 A | 7/1990 | Severinsky |
| 5,006,975 A | 4/1991 | Neufeld |
| 5,235,504 A | 8/1993 | Sood |
| 5,420,780 A | 5/1995 | Bernstein et al. |
| 5,515,261 A | 5/1996 | Bogdan |
| 5,532,918 A | 7/1996 | Mayrand et al. |
| 5,568,041 A | 10/1996 | Hesterman |
| 5,614,812 A | 3/1997 | Wagoner |
| 5,682,306 A | 10/1997 | Jansen |
| 5,684,426 A | 11/1997 | De Doncker |
| 5,715,154 A | 2/1998 | Rault |
| 5,757,635 A | 5/1998 | Seong |
| 5,790,395 A | 8/1998 | Hagen |
| 5,834,924 A | 11/1998 | Konopka et al. |
| 5,864,473 A | 1/1999 | Slack et al. |
| 5,886,431 A | 3/1999 | Rutigliano |
| 5,920,186 A | 7/1999 | Ninh et al. |
| 5,973,419 A | 10/1999 | Kruppa et al. |
| 5,991,175 A | 11/1999 | Liu |
| 5,994,882 A | 11/1999 | Ma |
| 6,108,222 A | 8/2000 | Liang |
| 6,150,800 A | 11/2000 | Kinoshita et al. |

OTHER PUBLICATIONS

IBM Technical Disclosure Bulletin; In–Rush Current Reduce Circuit; S. Sakaba; vol. 40 No. 06, Jun. 1997.

*Primary Examiner*—Adolf Deneke Berhane
(74) *Attorney, Agent, or Firm*—Sawyer Law Group, LLP

(57) ABSTRACT

Aspects for a power converter with power factor correction (PFC) circuit are described. The aspects include a buck/boost circuit for achieving a DC voltage from an AC input voltage signal line without developing an inrush current from the AC input voltage line, and a DC/DC converter circuit coupled to the buck/boost circuit for converting the DC voltage to a desired voltage level. The aspects are achieved in a straightforward, cost effective, and adaptable manner.

18 Claims, 2 Drawing Sheets

US 6,487,098 B2

POWER FACTOR CORRECTION (PFC) CIRCUIT THAT ELIMINATES AN INRUSH CURRENT LIMIT CIRCUIT

FIELD OF THE INVENTION

The present invention relates to power converters, and more particularly to providing a power factor correction circuit that eliminates an inrush current limit circuit for a power converter.

BACKGROUND OF THE INVENTION

An important consideration in the design of power converters is that a power converter provide a high power factor. Power factor correction (PFC) circuits are commonly used in desktop computers where a high power factor is required. The power factor of power converters generally refers to the ratio of the true power to the product of the voltage and current in the circuit. A high power factor is one which approximates or exceeds 0.9, with the maximum power factor being 1.0.

One type of power converter, a boost-type power converter, is a well-known and practical choice for a high power-factor converter used in motor drive and power supply applications. While this converter circuit realizes the line current waveform needed to comply with line harmonic standards, both present and anticipated, and can provide a nearly full conduction angle, a boost converter requires the output voltage to always be higher than the peak input voltage. If a lower voltage is needed as, for example, in motor drives operating at lower speeds, then, the voltage reduction function must be performed separately. This adds to the converter cost and complexity. Boost-type converters must also have power on input current surge limiting circuits, and output short-circuit current limiting circuits.

Buck-type power converters are also generally well-known in the art, and are frequently used in DC to DC converters. They can also used as AC to DC power converters. A major limitation of buck-type converters is that the duration for which power can be extracted from a single-phase line supply (input conduction angle) decreases when the converter output voltage increases. A consequence of this limitation is the cost of the power converter increases while the benefits derived from using it decrease, especially when a wide range of output voltages (motor speeds) is required.

A need exists for a power factor correction circuit that avoids limitations of prior art circuits. In particular, a need exists for a power factor correction circuit that eliminates an inrush current limit circuit and that allows the DC voltage to be lower than the peak of AC line voltage. The present invention addresses such a need.

SUMMARY OF THE INVENTION

The present invention provides aspects for a power converter with power factor correction circuit. The aspects include a buck/boost circuit for achieving a DC voltage from an AC input voltage signal line without developing an inrush current from the AC input voltage and a DC/DC converter circuit coupled to the buck/boost circuit for converting the DC voltage to a desired voltage level. The PFC circuit in accordance with the present invention is straightforward, cost effective and capable of being easily adapted to current technology.

DETAILED DESCRIPTION

The present invention relates to power factor correction circuits, such as for a processing system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
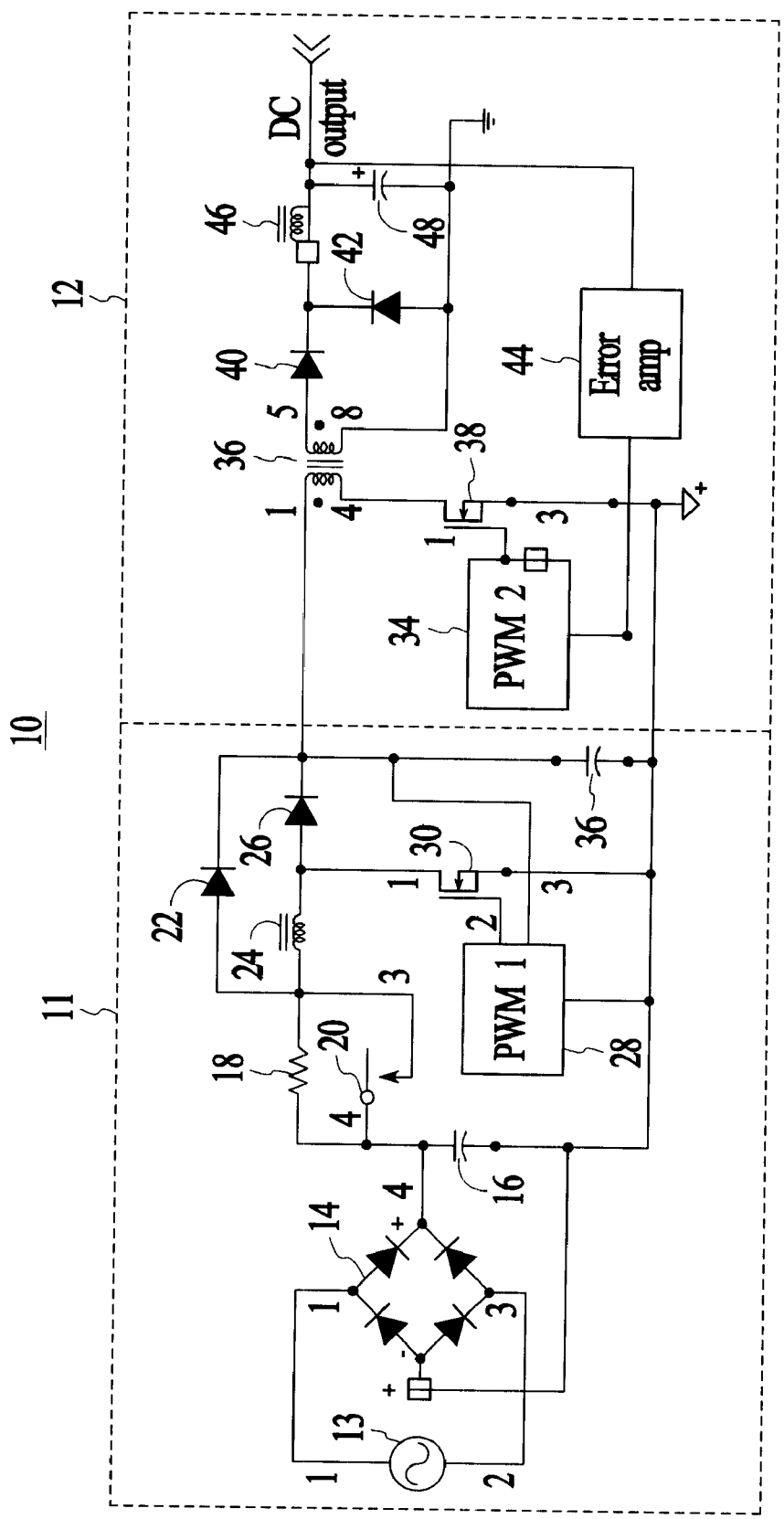
FIG. 1 shows a conventional PFC circuit configuration.

FIG. 1 depicts a conventional PFC circuit configuration 10. The PFC circuit configuration 10 includes a boost stage portion 11 coupled to a DC/DC converter portion 12. The boost stage portion 11 includes an AC line voltage input 13 coupled to a rectifier bridge 14 wherein the rectifier bridge 14 is coupled to a capacitor 16. The capacitor 16 is coupled to a low resistance relay 20 and a resistor 18. The resistor 18 is coupled to an inductor 24 wherein the inductor 24 is coupled to two diodes 22, 26. The inductor 24 is further coupled to a transistor 30 wherein the transistor 30 is coupled to a pulse width modulator (PWM) 28. The stage portion 11 also includes a bulk capacitor 32 coupled to the diode 26.

The DC/DC converter portion 12 includes a transformer 36 coupled to a diode 40 and a transistor 38 wherein the transistor 38 is coupled to a pulse width modulator 34. The diode 40 is coupled to a diode 42 and an inductor 46. The inductor 46 is coupled to a capacitor 48 and an error amplifier 44. The boost stage 11 develops a high voltage (i.e. 400V) across the bulk capacitor 32 and the DC/DC converter portion 12 converts the high voltage to a lower voltage (for example, 5V) output.

In this circuit, the diode 22 acts as a bypass diode and is used to prevent saturation of boost inductor 24. Unfortunately, this configuration introduces a problem of inrush current because of capacitor 32 charging at turn-on time. That is, at turn-on time, capacitor 32 is charged by the high resistance of resistor 18, which is later on bypassed by the low resistance relay 20. The inrush current produced can be hundreds of amperes if it is not limited by some external means. A further problem with the circuit 10 is its ability to boost the voltage higher than the peak of the input voltage.

Figure 2:
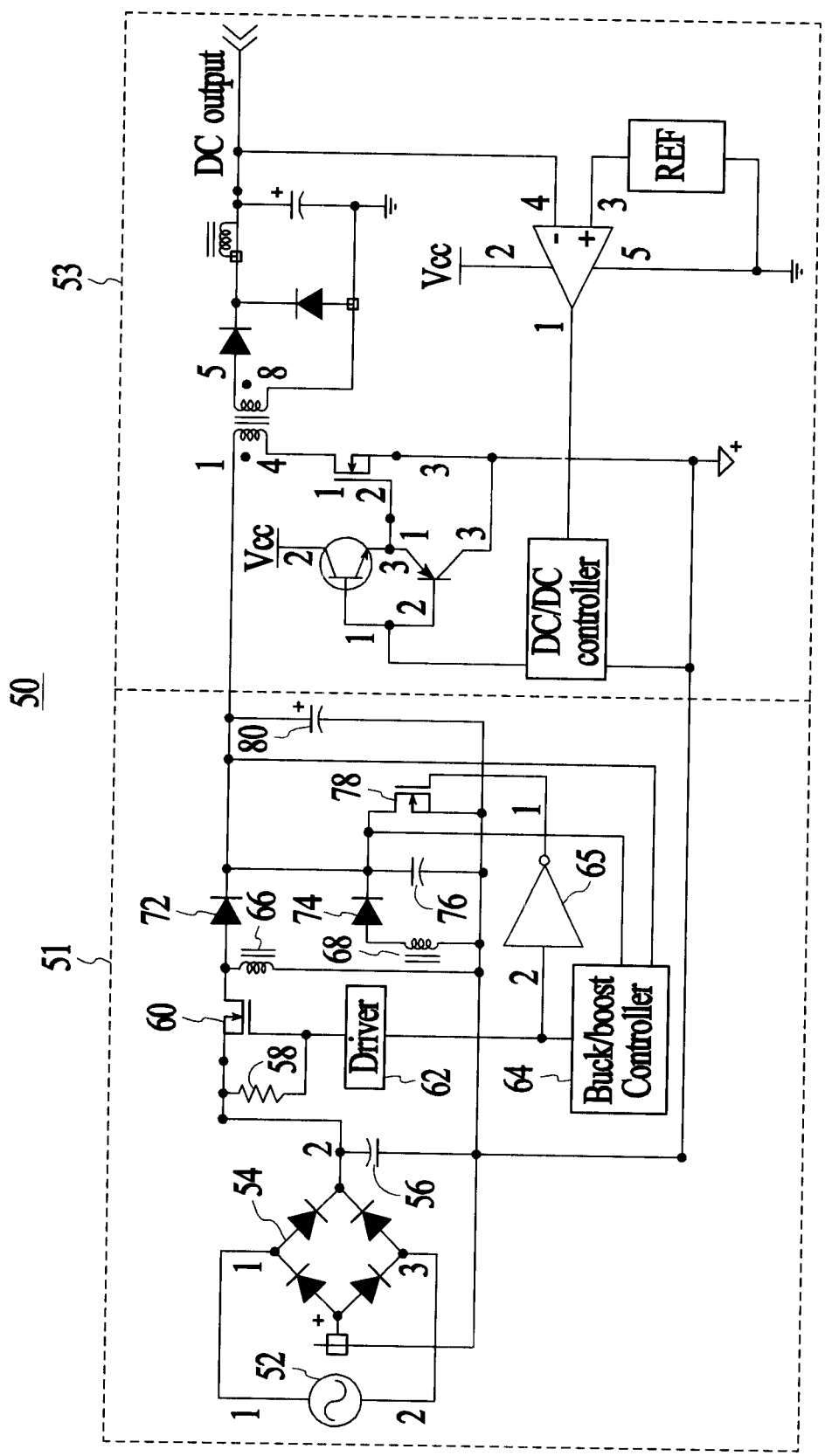
FIG. 2 shows a PFC circuit in accordance with the present invention.

In accordance with the present invention, a circuit 50, as shown in FIG. 2, prevents the above problems while providing power factor correction. The circuit 50 includes a buck/boost portion 51 coupled to a DC/DC converter portion 53. Although the DC/DC converter portion 53 is represented in a slightly different manner than DC/DC converter portion 12 of circuit 10 (FIG. 1), DC/DC converter 53 operates similarly to any forward converter, including DC/DC converter portion 12 of circuit 10 (FIG. 1), to develop an isolated DC output voltage, as is well appreciated by those skilled in the art.

The buck/boost portion 51 includes an AC line voltage input 52 coupled to a rectifier bridge 54, wherein the rectifier bridge 54 is coupled to a capacitor 56. The capacitor 56 is coupled to a resistor 58 and transistor 60, wherein the resistor 58 and transistor 60 are coupled to a driver 62. The driver 62 is coupled to a buck/boost controller 64 and inverter 65. The transistor 60 is further coupled to an inductor 66, which in turn is coupled to a transformer 66.

Transistor 60 and inductor 66 are also coupled to a diode 72, while transformer 68 is also coupled to diode 74. The diode 74 is further coupled to a capacitor 76, a transistor 78, and the buck/boost controller 64. The buck/boost portion 51 also includes a bulk capacitor 80 coupled to the diode 72.

For the operation of circuit 50, with the AC line current represented by Iac=A sin(wt)/(1+k sin(wt)), the line current is quasi-sinusoidal. Further, with the voltage developed across capacitor 80 given by V=(d/1−d)×Vacsin(wt), where 'd' represents the duty cycle of the signal, the voltage across capacitor 80 can be lower than the peak of the AC line voltage (Vac). To achieve the desired sine wave, the current flowing through inductor 66 is integrated and applied to the standard buck/boost controller module 64. In addition, with the rectifier bridge 54 being inverted as compared with the standard rectifier bridge for PFC circuits, the output of the rectifier bridge 54 is a negative fullwave voltage, which is converted into a positive DC voltage by the switching action of transistor 60, inductor 66, and diode 72.

As is clear from the circuit 50, the voltage across capacitor 80 is developed by the switching action of transistor 60 and diode 72. Thus, there is no path for inrush current at the time of turn-on of AC input voltage. Accordingly, the circuit 50 does not need to include components that account for an inrush current in the buck/boost converter portion 51. In this manner, the PFC circuit 50 in accordance with the present invention eliminates an inrush limit circuit, while also allowing the DC voltage to be lower than the peak of AC line voltage Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A power converter with power factor correction circuit comprising:
   a buck/boost circuit for achieving a DC voltage from an AC input voltage signal line without developing an inrush current from the AC input voltage line; and
   a DC/DC converter circuit coupled to the buck/boost circuit for converting the DC voltage to a desired voltage level.

2. The power converter of claim 1 wherein the buck/boost circuit further includes an inverted rectifier bridge coupled to the AC input voltage signal line.

3. The power converter of claim 2 further comprising a transistor coupled to the inverted rectifier bridge and a diode coupled to the transistor.

4. The power converter of claim 3 further comprising an inductor coupled to the transistor and the diode.

5. The power converter of claim 4 further comprising a capacitor coupled to the diode, wherein switching action of the transistor in conjunction with the diode and inductor develop the DC voltage across the capacitor.

6. The power converter of claim 5 further comprising a buck/boost controller coupled to the capacitor for adjusting the current flowing through the inductor.

7. A method for achieving power factor correction in a power converter, the method comprising:
   providing a buck/boost circuit for achieving a DC voltage from an AC input voltage signal line without developing an inrush current from the AC input voltage line; and
   coupling a DC/DC converter circuit to the buck/boost circuit for converting the DC voltage to a desired voltage level.

8. The method of claim 7 wherein providing the buck/boost circuit further comprises providing an inverted rectifier bridge coupled to the AC input voltage signal line.

9. The method of claim 8 wherein providing the buck/boost circuit further comprises providing a transistor coupled to the inverted rectifier bridge and a diode coupled to the transistor.

10. The method of claim 9 wherein providing the buck/boost circuit further comprises providing an inductor coupled to the transistor and the diode.

11. The method of claim 10 wherein providing the buck/boost circuit further comprises providing a capacitor coupled to the diode, wherein switching action of the transistor in conjunction with the diode and inductor develop the DC voltage across the capacitor.

12. The method of claim 11 wherein providing the buck/boost circuit further comprises providing a buck/boost controller coupled to the capacitor for adjusting the current flowing through the inductor.

13. A buck/boost power factor correction circuit comprising:
   an inverted rectifier bridge coupled to an AC voltage signal line input;
   a first transistor coupled to the inverted rectifier bridge;
   an inductor coupled to the transistor;
   a first diode coupled to the transistor and the inductor;
   a first capacitor coupled to the transistor and the inverted rectifier bridge; and
   a buck/boost controller coupled to the capacitor, wherein the circuit converts the AC voltage signal line input to a DC voltage at a desired voltage level, including a voltage level lower than a peak of the AC voltage signal line input without allowing an inrush current to develop.

14. The buck/boost power factor of claim 13 further comprising a resistor coupled to the first transistor.

15. The buck/boost power factor of claim 14 further comprising a driver coupled to the resistor, the first transistor, and the buck/boost controller.

16. The buck/boost power factor of claim 15 further comprising an inverter coupled to the buck/boost controller and the driver, and a second transistor coupled to the inverter.

17. The buck/boost power factor of claim 16 further comprising a second capacitor coupled to the second transistor, a second diode coupled to the second capacitor and the second transistor, and a transformer coupled to the second diode and the inductor.

18. The buck/boost power factor of claim 17 further comprising a third capacitor coupled to the inverted rectifier bridge.

* * * * *